H. H. FORREST.
TIRE MOLD.
APPLICATION FILED MAR. 29, 1919.

1,312,438.

Patented Aug. 5, 1919.
2 SHEETS—SHEET 1.

WITNESS:

INVENTOR.
H. H. Forrest
BY
ATTORNEYS.

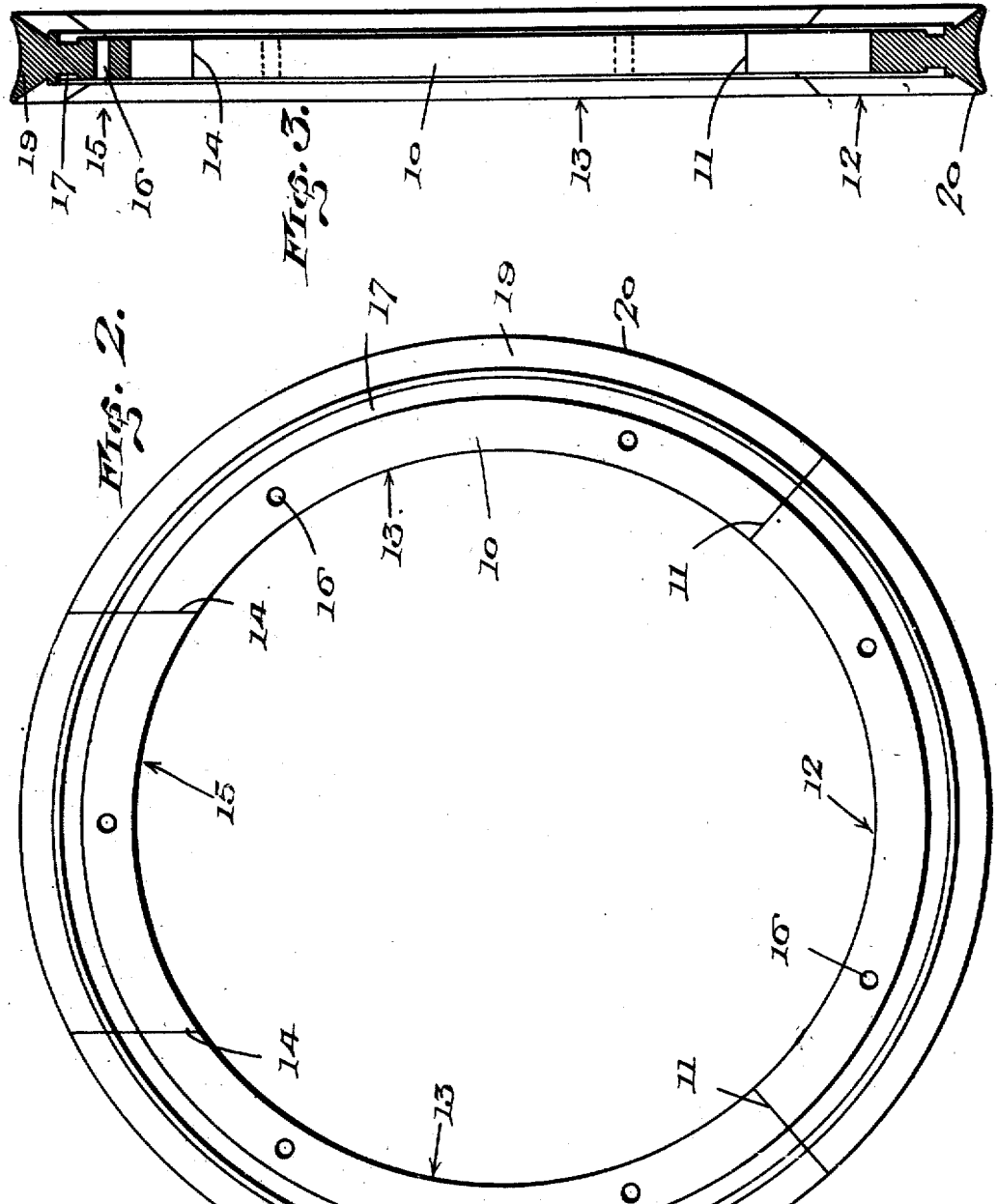

UNITED STATES PATENT OFFICE.

HOWARD H. FORREST, OF KENT, OHIO.

TIRE-MOLD.

1,312,438. Specification of Letters Patent. Patented Aug. 5, 1919.

Application filed March 29, 1919. Serial No. 285,962.

*To all whom it may concern:*

Be it known that I, HOWARD H. FORREST, a citizen of the United States, residing at Kent, in the county of Portage and State of Ohio, have invented certain new and useful Improvements in Tire-Molds; and I do hereby declare the following to be a full, clear, and exact description of the invention, such as will enable others skilled in the art to which it appertains to make and use the same.

The present invention relates generally to molds for curing pneumatic tire casings, and aims to provide new and useful improvements in such molds using an air bag, in order to overcome certain objections incident to the use of the ordinary air bags, and to obtain greater efficiency and an increased number of cures.

In the air bag mold heretofore used, the air bag is of a cross section to fit within the tire casing, and considerable difficulty has ensued by the use of such bags, due to the pinching of the bag, the tipping of the beads of the casing, and the like. The present air bags also result in roughness on the inside of the beads at the heel, and injuries to the apparatus and workmen sometimes result due to the premature application of air. The present construction is such that the foregoing and other objections are overcome by the provision of a special ring between the sections of the mold and around which the air bag is disposed, so that said ring will avoid all possibilities of the air bag being pinched, and will also provide for the perfect formation of the beads of the casing, as well as providing for safety to the workmen, because air is not applied until the "ringing up" is completed. This ring also enables the air bag to be of circular cross section, without square or angular corners as in the ordinary air bag, thus permitting the sections of the mold to seat perfectly without the liability of the bag becoming pinched or slipping down.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Fig. 2 is an elevation of the air bag ring.

Fig. 3 is a diametrical section thereof.

Figure 1:
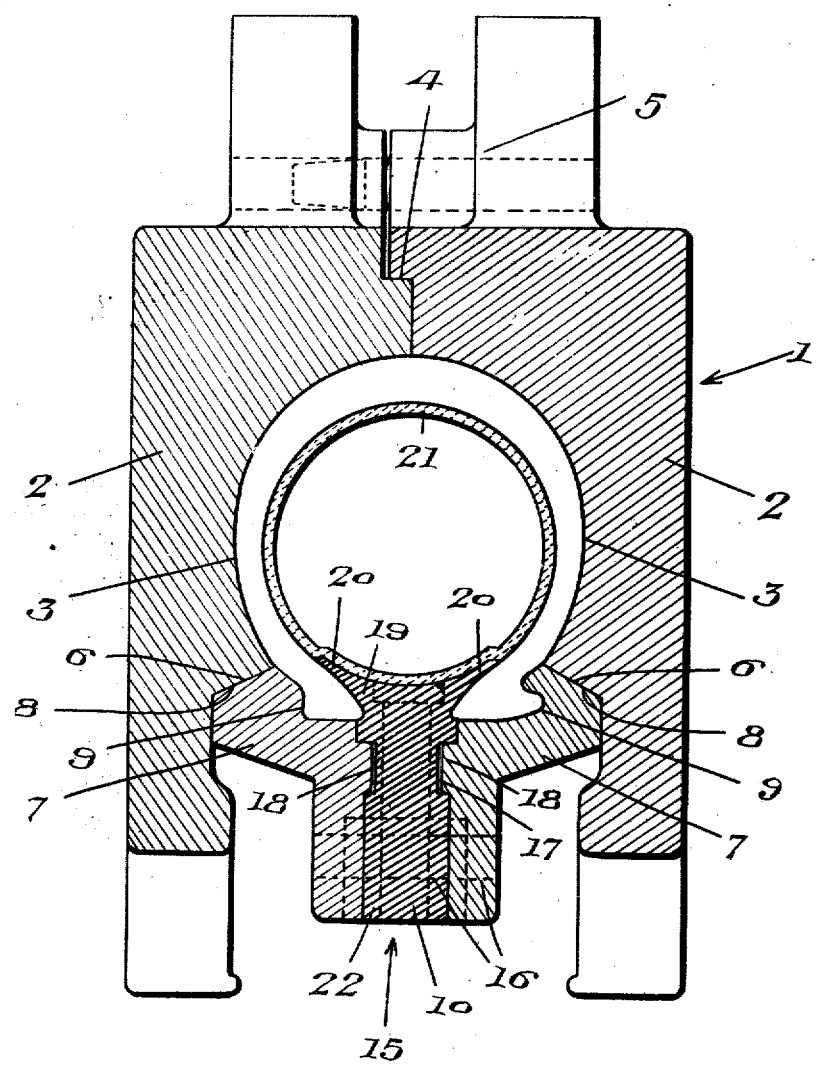
Figure 1 is a cross section of the mold showing the air bag ring and the air bag thereon.

The tire casing mold 1 is of conventional form, as illustrated, comprising the side sections 2 having the confronting recesses 3 conforming to the side walls and tread of the tire casing. The sections 1 have the slip joint 4 outside of the recesses 3, and suitable fastening means 5 to clamp said sections together, and at the inner sides of the recesses 3, the sections 2 have the shoulders 6, between which is disposed the inner mold member comprising the sections 7 having their opposite edges formed, as at 8, to fit the shoulder 6. These sections 7 have the recesses 9 to form the exterior surfaces of the beads of the casing (two different styles being illustrated).

In carrying out the invention, there is disposed between the sections 7, which are spaced apart, an air bag ring 10 which is suitably divided into several sections to facilitate assemblage. As shown, the ring 10 is divided on radial lines, as at 11, between sections 12 and 13, as seen in Fig. 2, and is divided on chordal parallel lines 14 between the sections 13 and a fourth section 15 which can be readily moved outwardly in to place between the sections 13. The opposite sides of the ring 10 are provided with annular grooves 17 to receive the annular ribs 18 with which the adjacent sides of the mold sections 7 are provided, thereby retaining the ring 10 in fixed position in the mold, and the mold sections 7 and ring 10 have apertures 16 for the reception of bolts or other means for clamping the parts together.

The outer edge of the ring 10 has a seat 19 extending outwardly into the cavity or chamber of the mold, as seen in Fig. 1, and the circumference of the seat 19 is concaved transversely, while the sides of the seat 19 diverge to provide the lips 20 overhanging the mold sections 7. These lips 20 are shaped to conform to the inner sides of the beads of the tire casing, and coöperate with the mold sections 7 to form perfect beads.

The air bag 21 which is of annular form, as usual, surrounds the ring 10, and with the provision of the seat 19, can be of circular cross section, as seen in Fig. 1, to snugly fit the seat 19 and lips 20. The ring 10 is provided with a radial bore 22 through which the inflating nipple of the bag 21 can extend. With this construction, the air bag does not extend downwardly between the beads of the casing, and will not be pinched or displaced, while the lips 20 with the mold sections 7 will form perfect beads.

Having thus described the invention, what is claimed as new is:—

1. A tire casing mold embodying side sections to conform to the sides of a tire casing, inner sections fitting the side sections having portions to conform to the exterior of the casing beads, a ring between said inner sections and having a portion projecting into the mold therefrom and formed to conform to the inner sides of the beads, and an air bag on said portion of the ring.

2. A tire casing mold embodying side sections to conform to the sides of a tire casing, a pair of inner sections fitting the side sections having portions to conform to the exterior surfaces of the casing beads, a ring between said inner sections having a portion projecting within the mold and provided at opposite sides with diverging lips overhanging said sections to conform to the inner sides of the beads, and an air bag seating against said portion between said lips.

3. A tire casing mold embodying side sections to conform to the sides of a tire casing, a pair of inner mold sections fitting the side sections having portions to conform to the exterior surfaces of the casing beads, a sectional ring between said inner mold sections and having an air bag seat projecting therefrom into the mold, said seat having lips at opposite sides diverging from one another and conforming to the inner sides of the beads, said seat being concaved transversely between said lips, and an air bag of circular cross section seated against said seat between said lips.

In testimony whereof I have signed my name to this specification in the presence of two subscribing witnesses.

HOWARD H. FORREST.

Witnesses:
 NYDAH McKIBBEN,
 BLAKE C. COOK.